US012754625B2

(12) United States Patent
Tomiyama et al.

(10) Patent No.: US 12,754,625 B2
(45) Date of Patent: Oct. 6, 2026

(54) ROTARY INPUT DEVICE

(71) Applicant: ALPS ALPINE CO., LTD., Tokyo (JP)

(72) Inventors: Tatsuhiro Tomiyama, Miyagi (JP); Yasuji Hagiwara, Tokyo (JP); Misuzu Suto, Miyagi (JP); Yasuo Kotera, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 19/271,972

(22) Filed: Jul. 17, 2025

(65) Prior Publication Data

US 2025/0341902 A1 Nov. 6, 2025

Related U.S. Application Data

(63) Continuation of application No. PCT/JP2024/001141, filed on Jan. 17, 2024.

(30) Foreign Application Priority Data

Feb. 20, 2023 (JP) ................................ 2023-024282

(51) Int. Cl.
*G06F 3/038* (2013.01)
*G06F 3/0354* (2013.01)
*G06F 3/0362* (2013.01)

(52) U.S. Cl.
CPC ............ *G06F 3/038* (2013.01); *G06F 3/0354* (2013.01); *G06F 3/0362* (2013.01)

(58) Field of Classification Search
CPC ...... G06F 3/038; G06F 3/0354; G06F 3/0362; G06F 3/016; G06F 3/01; G06F 3/03543
See application file for complete search history.

(56) References Cited

U.S. PATENT DOCUMENTS

2002/0063688 A1* 5/2002 Shaw .................. G06F 3/03547 345/163
2017/0269784 A1 9/2017 Nakajima et al.
(Continued)

FOREIGN PATENT DOCUMENTS

JP 2017-167711 9/2017
JP 2018-005763 1/2018
(Continued)

OTHER PUBLICATIONS

Machine translation of JP 2022-010453 A (Year: 2022).*
International Search Report for PCT/JP2024/001141 mailed on Mar. 5, 2024.

*Primary Examiner* — Patrick N Edouard
*Assistant Examiner* — Joseph P Fox
(74) *Attorney, Agent, or Firm* — IPUSA, PLLC

(57) ABSTRACT

A rotary input device includes an operation knob including an upper surface and a lateral surface, an angle detector configured to detect a rotation angle of the operation knob, a kinesthetic haptic feedback part configured to provide at least one of a driving force or a braking force to the operation knob as kinesthetic haptic feedback, control circuitry configured to control the kinesthetic haptic feedback part, a lateral surface sensor electrode provided on the lateral surface of the operation knob, and an electrostatic sensor configured to detect a contact of an operating body with the lateral surface sensor electrode, wherein the control is circuitry configured to control the kinesthetic haptic feedback part so as to provide kinesthetic haptic feedback to the operation knob according to a detection result of the electrostatic sensor and a detection result of the angle detector.

14 Claims, 11 Drawing Sheets

(56) References Cited

U.S. PATENT DOCUMENTS

| | | | |
|---|---|---|---|
| 2018/0011556 | A1 | 1/2018 | Minyu et al. |
| 2018/0164901 | A1 | 6/2018 | O'Mahony et al. |
| 2019/0149723 | A1 | 5/2019 | Misawa et al. |

FOREIGN PATENT DOCUMENTS

| | | |
|---|---|---|
| JP | 2022-010453 | 1/2022 |
| WO | 2018/020938 | 2/2018 |

* cited by examiner

ROTARY INPUT DEVICE

CROSS-REFERENCE TO RELATED APPLICATION

This application is a continuation application of International Application NO. PCT/JP2024/001141, filed on Jan. 17, 2024, and designated the U.S., which is based upon and claims priority to Japanese Patent Application No. 2023-024282, filed on Feb. 20, 2023. The entire contents of these applications are incorporated herein by reference.

BACKGROUND OF THE INVENTION

1. Field of the Invention

The disclosures herein relate to rotary input devices.

2. Description of the Related Art

Patent Literature (PTL) 1 relates to an operation input device including a touch pad that allows a touch operation with an operator's finger on an upper surface of a dial operated with the operator's finger. PTL 1 discloses a technology for preventing a movement of the dial with a brake mechanism while the touch operation on the touch pad is performed.

However, although the operation input device of PTL 1 can detect a contact of the operator's finger with the upper surface of the dial with the touch pad, the operation input device cannot detect gripping by the operator's finger of a lateral surface of the dial. Therefore, the operation input device of PTL 1 cannot apply kinesthetic haptic feedback to the dial according to a posture of the operator's finger, even if a configuration for applying the kinesthetic haptic feedback to the dial is adopted.

CITATION LIST

Patent Literature

[PTL 1] Japanese Laid-Open Patent Publication No. 2017-167711

SUMMARY OF THE INVENTION

A rotary input device includes an operation knob including an upper surface and a lateral surface, an angle detector configured to detect a rotation angle of the operation knob, a kinesthetic haptic feedback part configured to provide at least one of a driving force or a braking force to the operation knob as kinesthetic haptic feedback, control circuitry configured to control the kinesthetic haptic feedback part, a lateral surface sensor electrode provided on the lateral surface of the operation knob, and an electrostatic sensor configured to detect a contact of an operating body with the lateral surface sensor electrode, wherein the control circuitry is configured to control the kinesthetic haptic feedback part so as to provide kinesthetic haptic feedback to the operation knob according to a detection result of the electrostatic sensor and a detection result of the angle detector.

According to the rotation input device of one embodiment, it is possible to give kinesthetic haptic feedback to the operation knob according to the posture of the operator's finger.

DESCRIPTION OF THE PREFERRED EMBODIMENTS

In the following, one embodiment will be described with reference to the accompanying drawings. In the following description, for the sake of convenience, a Z-axis direction in the figure refers to a vertical direction, an X-axis direction in the figure refers to a front-back direction, and a Y-axis direction in the figure refers to a left-right direction. A positive direction of the X-axis is a forward direction, a positive direction of the Y-axis is a right direction, and a positive direction of the Z-axis is an upward direction. These indicate a relative positional relationship in a device, and do not limit an installation direction or operation direction of the device. All devices having the same relative positional relationship in the device, even those having different installation directions or operation directions, are included in the scope of rights of the present disclosure.

(Configuration of Rotation Input Device 100)

Figure 1:
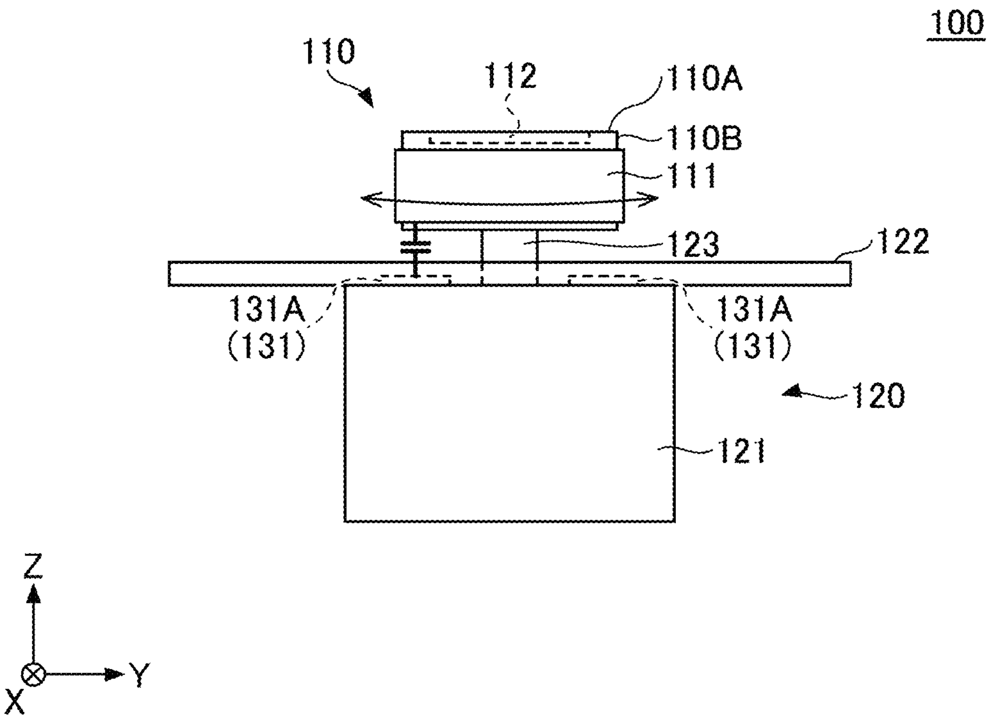
FIG. 1 is a drawing schematically illustrating a configuration of a rotation input device according to one embodiment.

FIG. 1 is a drawing schematically illustrating a configuration of a rotation input device 100 according to one embodiment. The rotation input device 100 shown in FIG. 1 is a device mounted in a vehicle such as an automobile, for example, and rotated by an operator in order to electrically control various control target devices 10 (e.g., audio, car navigation device, air conditioner, electronic shifter) provided in the vehicle. However, the rotation input device 100 may be used for a device other than the vehicle (e.g., machine tool, game machine, aircraft, railcar, remote control).

As shown in FIG. 1, the rotation input device 100 includes an operation knob 110 and a main body 120.

The operation knob 110 is provided above (Z-axis positive direction) the main body 120 at a predetermined distance from an upper surface of the main body 120, and is a member to be rotated by the operator. The operation knob 110 has a cylindrical outer shape and has an upper surface 110A and a lateral surface 110B.

The operation knob 110 is connected to an upper end of a rotating shaft 123 of the main body 120. Thus, the operation knob 110 is rotatably supported by the rotating shaft 123. Accordingly, when the operator performs a rotary operation, the operation knob 110 rotates around an axis of the rotating shaft 123 together with the rotating shaft 123.

A lateral surface sensor electrode 111 having conductivity is provided on the lateral surface 110B of the operation knob 110 so as to cover substantially the entire surface of the lateral surface 110B. For example, the lateral surface sensor electrode 111 is provided on the lateral surface 110B of the operation knob 110 by forming a thin film on the lateral surface 110B of the operation knob 110 using a conductive material. When the operator rotates the operation knob 110, the lateral surface sensor electrode 111 is brought into contact with the operator's operating body (e.g., finger). Consequently, the lateral surface sensor electrode 111 is electrostatically coupled with the operator's operating body, and capacitance of the lateral surface sensor electrode 111 increases.

An insulating part 112 having insulation property is provided on the upper surface 110A of the operation knob 110 so that the lateral surface sensor electrode 111 is not electrostatically coupled with the operator's operating body when the operator's operating body contacts the upper surface 110A.

The main body 120 includes a housing 121, a circuit board 122, and a rotating shaft 123.

The housing 121 is a box-shaped member having a hollow structure. Various components are housed in the housing 121.

The circuit board 122 is a plate-like horizontal resin member provided on the upper surface of the housing 121. On a rear surface (Z-axis negative direction) of the circuit board 122, a substrate sensor electrode 131A included in an electrostatic sensor 131 is provided at a position at which the substrate sensor electrode 131A can be electrostatically coupled with the lateral surface sensor electrode 111 provided on the operation knob 110. When the operator's operating body contacts the lateral surface sensor electrode 111, the substrate sensor electrode 131A is electrostatically coupled with the lateral surface sensor electrode 111, so that the capacitance of the substrate sensor electrode 131A changes similarly to the lateral surface sensor electrode 111. Therefore, the electrostatic sensor 131 can detect the contact of the operating body with the lateral surface sensor electrode 111 by detecting the capacitance of the substrate sensor electrode 131A.

The rotating shaft 123 is a rod-shaped member provided so as to extend from the inside of the housing 121 to the upper direction (positive Z-axis direction) of the housing 121 through the surface of the housing 121 and the circuit board 122. The rotating shaft 123 is provided rotatably around the axis of the rotating shaft 123. The rotating shaft 123 supports the operation knob 110 so as to be rotatable integrally with the rotating shaft 123.

(Configuration of Main Body 120)

Figure 2:
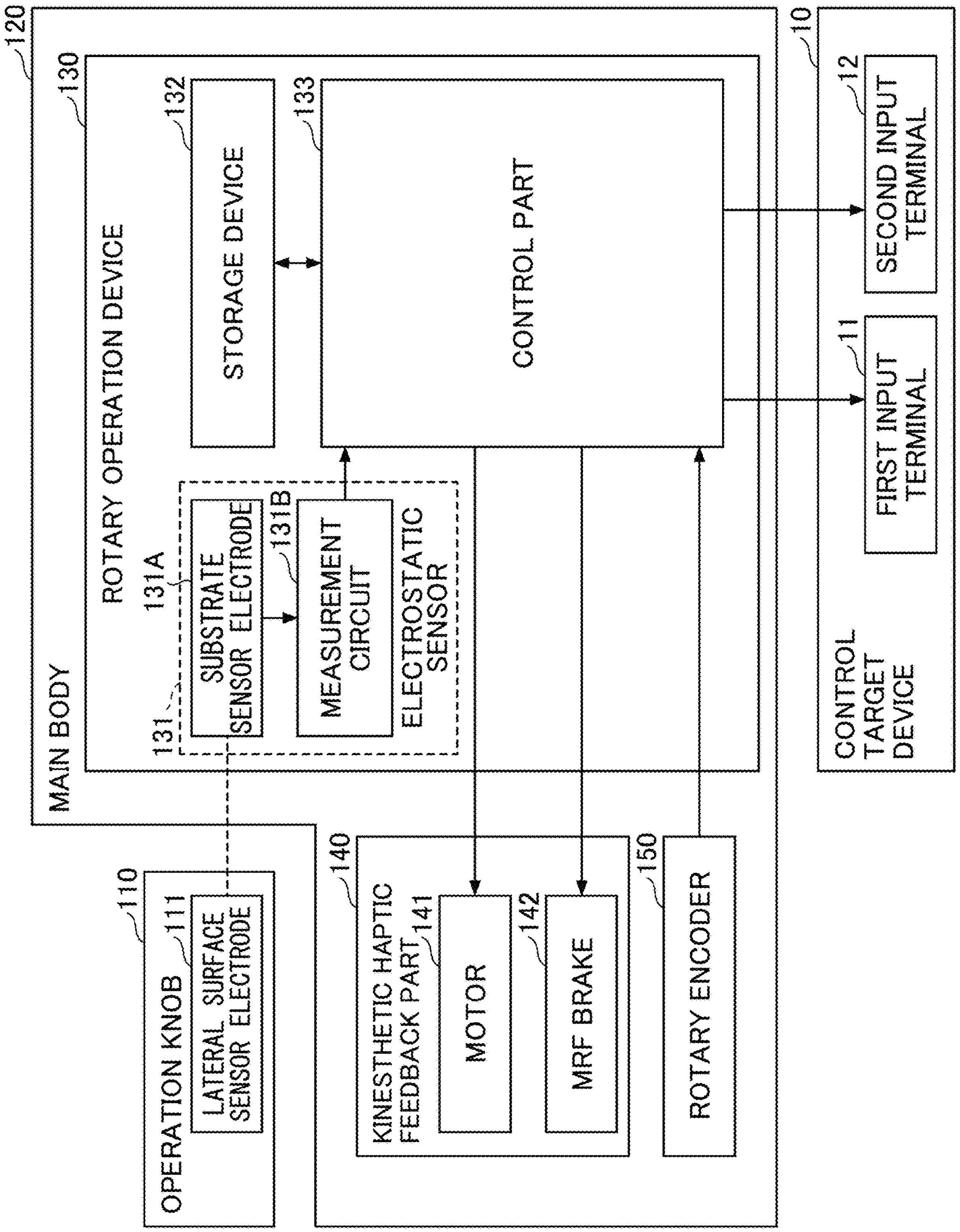
FIG. 2 is a block diagram illustrating a configuration of a main body of the rotation input device according to one embodiment.

FIG. 2 is a block diagram illustrating a configuration of a main body 120 of the rotation input device 100 according to one embodiment. As shown in FIG. 2, the main body 120 includes a rotary operation device 130, a kinesthetic haptic feedback part 140, and a rotary encoder 150.

The rotary encoder 150 is an example of an "angle detector". The rotary encoder 150 detects the rotation angle of the rotating shaft 123 as the rotation angle of the operation knob 110. Since the rotating shaft 123 rotates integrally with the operation knob 110, the rotation angle of the rotating shaft 123 is equal to the rotation angle of the operation knob 110. Therefore, the rotary encoder 150 can detect the rotation angle of the rotating shaft 123 as the rotation angle of the operation knob 110.

The kinesthetic haptic feedback part 140 has a motor 141 and an MRF (Magneto-Rheological Fluid) brake 142.

The motor 141 can provide a driving force to the operation knob 110 as kinesthetic haptic feedback via the rotating shaft 123 by operating controlled by the control part 133 of the rotary operation device 130.

The MRF brake 142 has a structure for changing the braking force provided to the operation knob 110 by a magneto-viscous fluid. Controlled by the control part 133 of the rotary operation device 130, the MRF brake 142 operates to apply a braking force to the operation knob 110 via the rotating shaft 123, and this braking force is perceived as kinesthetic haptic feedback.

The rotary operation device 130 is a device for controlling the kinesthetic haptic feedback part 140 so that the rotary operation of the operation knob 110 is detected and the kinesthetic haptic feedback corresponding to the detected rotary operation is provided to the operation knob 110. The rotary operation device 130 includes the electrostatic sensor 131, a storage device 132, and the control part 133.

The electrostatic sensor 131 has the substrate sensor electrode 131A and a measurement circuit 131B. As shown in FIG. 1, the substrate sensor electrode 131A is provided on the rear surface (surface in the Z-axis negative direction) of the circuit and can be electrostatically coupled with the lateral surface sensor electrode 111 provided on the operation knob 110.

The measurement circuit 131B detects the contact of the operating body with the lateral surface sensor electrode 111 by detecting the capacitance of the substrate sensor electrode 131A. For example, when the capacitance of the substrate sensor electrode 131A exceeds a predetermined threshold, the measurement circuit 131B determines that the operating body is in contact with the lateral surface sensor electrode 111.

The storage device 132 stores a control profile to be used when the control part 133 controls the kinesthetic haptic feedback part 140. For example, the control profile defines control parameters for the kinesthetic haptic feedback part 140 based on each combination of the detection value from the electrostatic sensor 131 and the detection value from the rotary encoder 150.

The control part 133 controls the kinesthetic haptic feedback part 140. In particular, can control the kinesthetic the control part 133 c haptic feedback part 140 so as to provide the kinesthetic haptic feedback to the operation knob 110 according to the detection result of the electrostatic sensor 131 and the detection result of the rotary encoder 150 in accordance with the control profile stored in the storage device 132.

Further, the control part 133 can output the detection result of the electrostatic sensor 131 to a first input terminal 11 of the control target device 10. Further, the control part 133 can output the detection result of the rotary encoder 150 to a second input terminal 12 of the control target device 10.

Alternatively, the control part 133 may output the detection result of the rotary encoder 150 to the first input terminal 11 of the control target device 10 when the contact of the operating body with the lateral surface sensor electrode 111 is detected, and output the detection result of the rotary encoder 150 to the second input terminal 12 of the control target device 10 when the contact of the operating body with the lateral surface sensor electrode 111 is not detected.

Alternatively, the control part 133 may output only the detection result of the rotary encoder 150 to the first input terminal 11 or the second input terminal 12 of the control target device 10 when the contact of the operating body with the lateral surface sensor electrode 111 is not detected, and may output the detection result of the rotary encoder 150 and a signal indicating the contact of the operating body with the lateral surface sensor electrode 111 when the contact of the operating body with the lateral surface sensor electrode 111 is detected.

(Example of Rotation of Operation Knob 110 (First Example))

Figure 3:
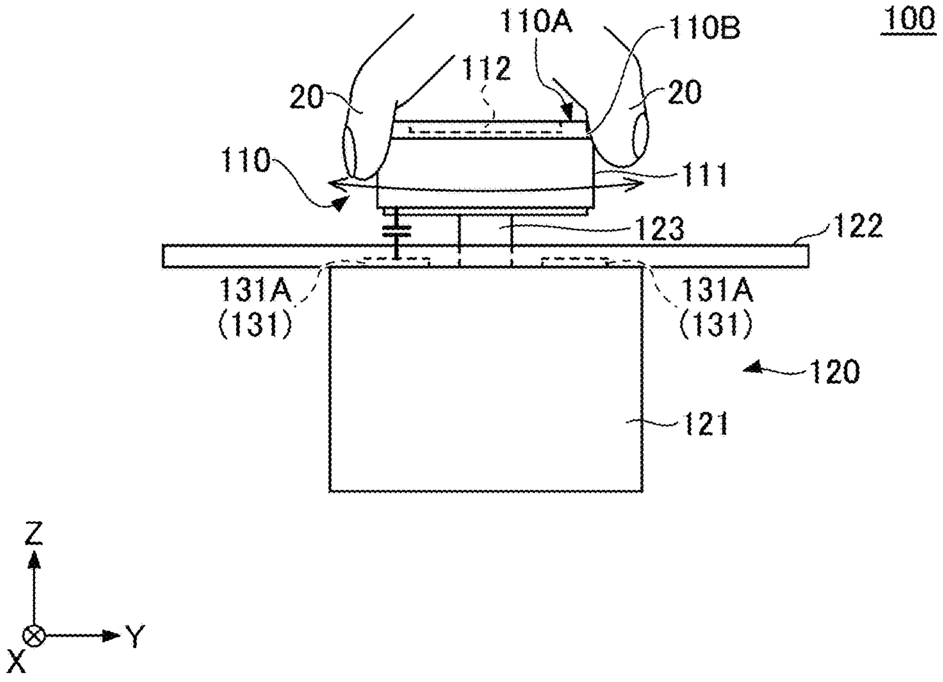
FIG. 3 is a drawing illustrating an example (first example) of a rotary operation of an operation knob in the rotation input device according to one embodiment.

FIG. 3 is a drawing illustrating an example (first example) of a rotary operation of an operation knob 110 in the rotation input device 100 according to one embodiment. FIG. 3 shows a rotary operation of the operation knob 110 in a state where the lateral surface 110B of the operation knob 110 is gripped by the operator's finger 20.

As shown in FIG. 3, when the operation knob 110 is rotated in a state where the lateral surface 110B of the operation knob 110 is gripped by the operator's finger 20, the rotating shaft 123 rotates integrally with the operation knob 110. At this time, the rotary encoder 150 detects the rotation angle of the rotating shaft 123 as the rotation angle of the operation knob 110.

Further, since the operator's finger 20 is in contact with the lateral surface sensor electrode 111 provided on the lateral surface 110B of the operation knob 110, the lateral surface sensor electrode 111 is electrostatically coupled with the operator's finger 20, and the capacitance of the lateral surface sensor electrode 111 increases. Accordingly, the substrate sensor electrode 131A of the electrostatic sensor 131 is electrostatically coupled with the lateral surface sensor electrode 111, and the capacitance of the substrate sensor electrode 131A increases. Then, the measurement circuit 131B of the electrostatic sensor 131 detects the increased capacitance of the substrate sensor electrode 131A, and detects that the operator's finger 20 is in contact with the lateral surface sensor electrode 111.

Then, based on the rotation angle of the operation knob 110 detected by the rotary encoder 150 and the contact of the operator's finger 20 with the lateral surface sensor electrode 111 detected by the measurement circuit 131B, the control part 133 of the rotary operation device 130 controls the kinesthetic haptic feedback part 140 (one or both of the motor 141 and the MRF brake 142) according to the control profile stored in the storage device 132.

Thus, the rotation input device 100 according to one embodiment can provide the kinesthetic haptic feedback to the operation knob 110 based on both the rotary operation of the operation knob 110 performed by gripping the lateral surface 110B of the operation knob 110 and the rotation angle of the operation knob 110.

The control part 133 of the rotary operation device 130 outputs the rotation angle of the operation knob 110 detected by the rotary encoder 150 and the contact of the operator's finger 20 with the lateral surface sensor electrode 111 detected by the measurement circuit 131B to the control target device 10.

Thus, the control target device 10 can perform a predetermined function based on both the rotary operation of the operation knob 110 by gripping the lateral surface 110B of the operation knob 110 and the rotation angle of the operation knob 110.

Figure 4:
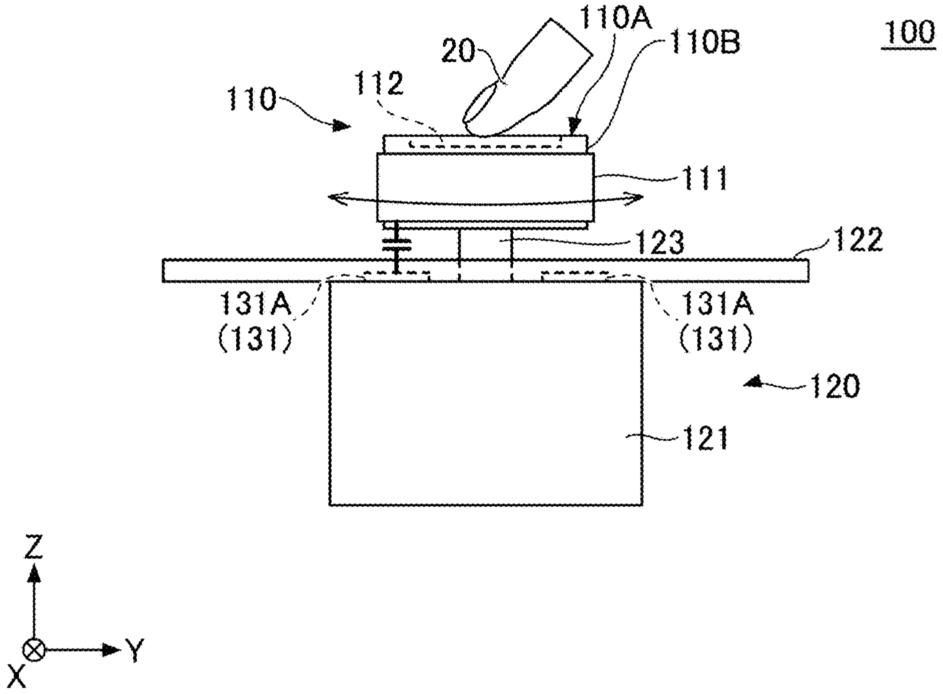
FIG. 4 is a drawing illustrating an example (second example) of a rotary operation of the operation knob in the rotation input device according to one embodiment.

FIG. 4 is a drawing illustrating an example (second example) of a rotary operation of the operation knob 110 in the rotation input device 100 according to one embodiment. FIG. 4 shows the rotary operation of the operation knob 110 with the operator's finger 20 in contact with the upper surface 110A of the operation knob 110.

As shown in FIG. 4, when the operation knob 110 is rotated with the operator's finger 20 in contact with the upper surface 110A of the operation knob 110, the rotating shaft 123 rotates integrally with the operation knob 110. At this time, the rotary encoder 150 detects the rotation angle of the rotating shaft 123 as the rotation angle of the operation knob 110.

Since the operator's finger 20 is in contact with the insulating part 112 provided on the upper surface 110A of the operation knob 110, the lateral surface sensor 111 electrode is not electrostatically coupled with the operator's finger 20, and the capacitance of the lateral surface sensor electrode 111 is not increased. Therefore, the substrate sensor electrode 131A of the electrostatic sensor 131 is not electrostatically coupled with the lateral surface sensor electrode 111, and the capacitance of the substrate sensor electrode 131A is not increased. Then, the measurement circuit 131B of the electrostatic sensor 131 detects the non-increased capacitance of the substrate sensor electrode 131A, and detects that the operator's finger 20 is not in contact with the lateral surface sensor electrode 111 (i.e., the operator's finger 20 is in contact with the insulating part 112).

Then, based on the rotation angle of the operation knob 110 detected by the rotary encoder 150 and the fact that the operator's finger 20 is not in contact with the lateral surface sensor electrode 111 detected by the measurement circuit 131B, the control part 133 of the rotary operation device 130 controls the kinesthetic haptic feedback part 140 (one or both of the motor 141 and the MRF brake 142) according to the control profile stored in the storage device 132.

Thus, the rotation input device 100 according to one embodiment can provide the kinesthetic haptic feedback to the operation knob 110 based on both the rotary operation of the operation knob 110 performed by gripping the upper surface 110A of the operation knob 110 and the rotation angle of the operation knob 110.

The control part 133 of the rotary operation device 130 outputs the rotation angle of the operation knob 110 detected by the rotary encoder 150 and the absence of contact of the operator's finger 20 with the lateral surface sensor electrode 111 detected by the measurement circuit 131B to the control target device 10.

Thus, the control target device 10 can perform a predetermined function based on both the rotary operation of the operation knob 110 by gripping the upper surface 110A of the operation knob 110 and the rotation angle of the operation knob 110.

As described above, the rotation input device 100 according to one embodiment includes the operation knob 110 having the upper surface 110A and the lateral surface 110B, a rotary encoder 150 for detecting the rotation angle of the operation knob 110, a kinesthetic haptic feedback part 140 for providing at least one of the driving force and the braking force to the operation knob 110 as the kinesthetic haptic feedback, a control part 133 for controlling the kinesthetic haptic feedback part 140, a lateral surface sensor electrode 111 provided on the lateral surface 110B of the operation knob 110, and an electrostatic sensor 131 for detecting the contact of the operating body with the lateral surface sensor electrode 111. The control part 133 controls the kinesthetic haptic feedback part 140 so as to provide the kinesthetic haptic feedback to the operation knob 110 according to the detection result of the electrostatic sensor 131 and the detection result of the rotary encoder 150.

Thus, the rotation input device 100 according to one embodiment can cause different kinesthetic haptic feedback to be generated for a case when the operation knob 110 is operated with a contact of the operating body with the lateral surface 110B and a case when the operation knob 110 is operated without a contact of the operating body with the lateral surface 110B. Accordingly, in one embodiment, the rotation input device 100 can provide the operation knob 110 with kinesthetic haptic feedback that corresponds to the posture of the operator's finger 20.

In addition, the rotation input device 100 according to one embodiment is provided with a main body 120 including the kinesthetic haptic feedback part 140, the rotary encoder 150, and the rotating shaft 123 rotating integrally with the operation knob 110. The kinesthetic haptic feedback part 140 provides the kinesthetic haptic feedback to the operation knob 110 via the rotating shaft 123, the rotary encoder 150 detects the rotation angle of the rotating shaft 123 as the rotation angle of the operation knob 110, and the electrostatic sensor 131 has a substrate sensor electrode 131A provided in the main body 120 at a position at which the substrate sensor electrode 131A can be electrostatically coupled with the lateral surface sensor electrode 111, and detects the contact of the operating body with the lateral surface sensor electrode 111 by detecting the capacitance of the substrate sensor electrode 131A.

Thus, in the rotation input device 100 according to one embodiment, since the operation knob 110 is not provided with a member that requires an interconnecting member (e.g., cables, flexible substrates), an interconnecting member connecting the operation knob 110 and the main body 120 is unnecessary. Therefore, in the rotation input device 100 according to one embodiment, there is no defect (e.g., disconnection, twisting) of an interconnecting member due to the rotary operation of the operation knob 110.

In addition, in the rotation input device 100 according to one embodiment, the control part 133 controls the kinesthetic haptic feedback part 140 so as to provide the kinesthetic haptic feedback according to the rotation angle to the operation knob 110, and cause different kinesthetic haptic feedback to be generated for a case when the electrostatic sensor 131 detects a contact of the operating body with the lateral surface sensor electrode 111 and a case when the electrostatic sensor 131 does not detect the contact of the operating body with the lateral surface sensor electrode 111.

Thus, the rotation input device 100 according to one embodiment can cause different kinesthetic haptic feedback to be generated for a case when the operation knob 110 is operated with a contact of the operating body with the lateral surface 110B and a case when the operation knob 110 is operated without a contact of the operating body with the lateral surface 110B. Therefore, according to the rotation input device 100 according to one embodiment, the kinesthetic haptic feedback can be provided to the operation knob 110 in accordance with the posture of the operator's finger 20.

(Example of Configuration of Operation Knob 110 (First Example))

Figure 5A:
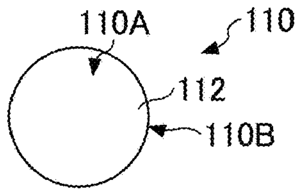
FIG. 5A is a drawing illustrating an example (first example) of a configuration of the operation knob in the rotation input device according to one embodiment.
Figure 5B:
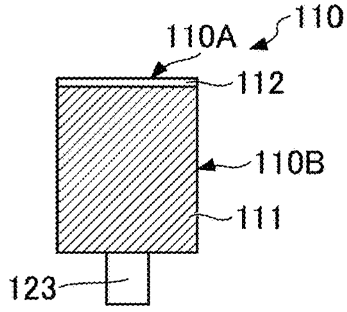
FIG. 5B is a drawing illustrating the example (first example) of the configuration of the operation knob in the rotation input device according to one embodiment.
Figure 5C:
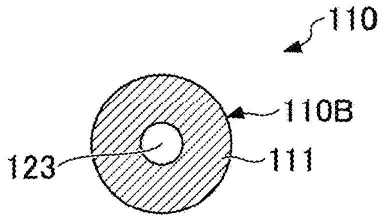
FIG. 5C is a drawing illustrating the example (first example) of the configuration of the operation knob in the rotation input device according to one embodiment.
Figure 5D:
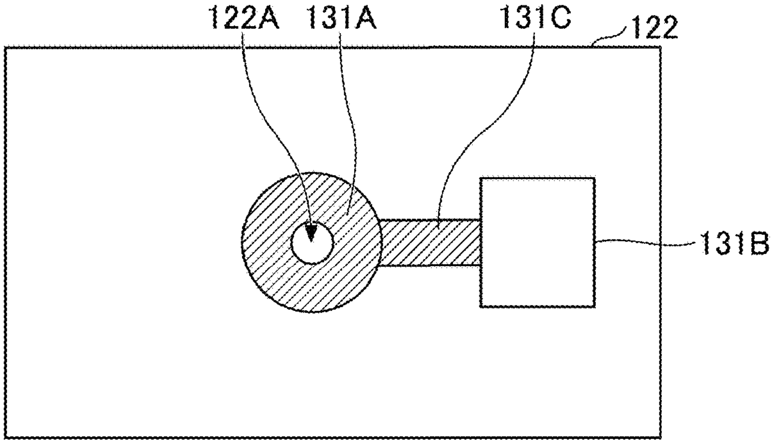
FIG. 5D is a drawing illustrating the example (first example) of the configuration of the operation knob in the rotation input device according to one embodiment.

FIGS. 5A to 5D are drawings illustrating an example (first example) of a configuration of the operation knob 110 in the rotation input device 100 according to one embodiment. FIG. 5A is a top view of the operation knob 110 according to the first example. FIG. 5B is a side view of the operation knob 110 according to the first example. FIG. 5C is a bottom view of the operation knob 110 according to the first example. FIG. 5D is a top view of the circuit board 122 corresponding to the operation knob 110 according to the first example.

As shown in FIGS. 5A to 5D, the operation knob 110 according to the first example is provided with one surface lateral sensor electrode 111 annularly without interruption over the entire periphery of the lateral surface 110B. Thus, the operation knob 110 according to the first example can surely detect the contact by the one lateral surface sensor electrode 111 even if the operator's finger 20 contacts any angle of the lateral surface 110B of the operation knob 110.

As shown in FIGS. 5A to 5D, the operation knob 110 according to the first example is provided with an insulating part 112 over the entire area of the upper surface 110A. Thus, even if the operator's finger 20 contacts any position of the upper surface 110A, the operation knob 110 according to the first example can surely prevent the contact from being detected as contact with the lateral surface 110B.

As shown in FIGS. 5A to 5D, in the circuit board 122 corresponding to the operation knob 110 according to the first example, one substrate sensor electrode 131A is provided at a position facing the bottom surface of the operation knob 110 in the same shape (i.e., annular) as the one lateral surface sensor electrode 111 of the operation knob 110. Thus, in the circuit board 122 corresponding to the operation knob 110 according to the first example, even if the operator's finger 20 contacts the lateral surface 110B of the operation knob 110 at any angle, the contact can be surely detected by the electrostatic coupling of one substrate sensor electrode 131A to one lateral surface sensor electrode 111. In the circuit board 122 shown in FIGS. 5A to 5D, a circular through-hole 122A for penetrating the rotating shaft 123 is formed at the annular center position formed by one substrate sensor electrode 131A.

In addition, as shown in FIGS. 5A to 5D, the circuit board 122 corresponding to the operation knob 110 according to the first example is provided with a measurement circuit 131B and an interconnecting part 131C integrally formed with the substrate sensor electrode 131A, and the measurement circuit 131B is connected to one substrate sensor electrode 131A through the interconnecting part 131C.

Thus, the circuit board 122 corresponding to the operation knob 110 according to the first example is configured so that the capacitance of one substrate sensor electrode 131A can be detected by the measurement circuit 131B.

(Example of Configuration of Operation Knob 110 (Second Example))

Figure 6A:
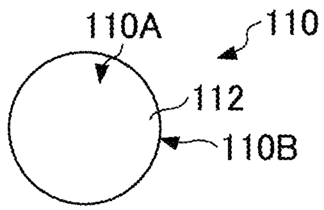
FIG. 6A is a drawing illustrating an example (second example) of a configuration of the operation knob in the rotation input device according to one embodiment.
Figure 6B:
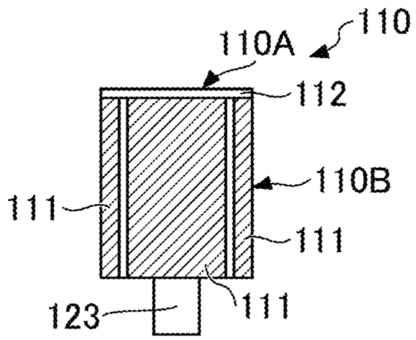
FIG. 6B is a drawing illustrating the example (second example) of the configuration of the operation knob in the rotation input device according to one embodiment.
Figure 6C:
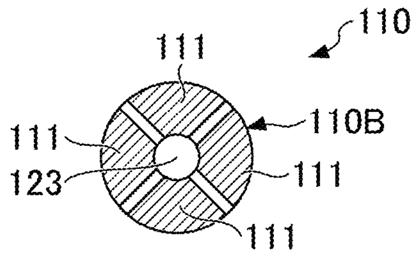
FIG. 6C is a drawing illustrating the example (second example) of the configuration of the operation knob in the rotation input device according to one embodiment.
Figure 6D:
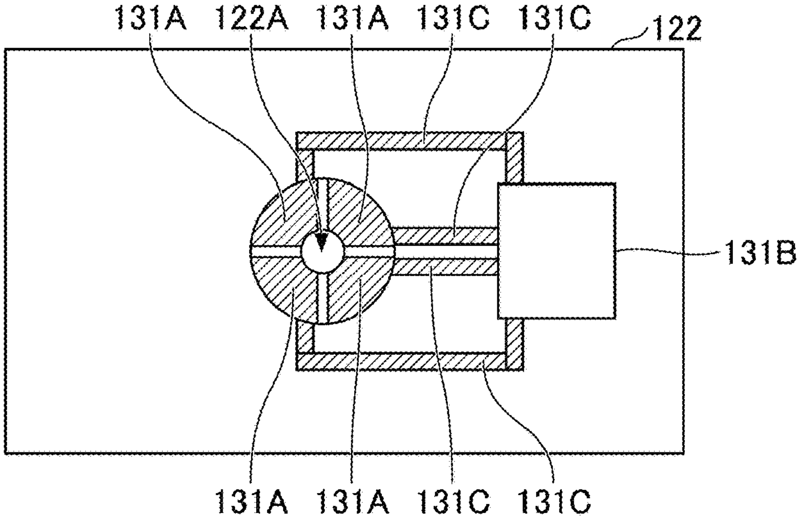
FIG. 6D is a drawing illustrating the example (second example) of the configuration of the operation knob in the rotation input device according to one embodiment.

FIGS. 6A to 6D are drawings illustrating an example (second example) of a configuration of the operation knob 110 in the rotation input device 100 according to one embodiment. FIG. 6A is a top view of the operation knob 110 according to the second example. FIG. 6B is a side view of the operation knob 110 according to the second example. FIG. 6C is a bottom view of the operation knob 110 according to the second example. FIG. 6D is a top view of the circuit board 122 corresponding to the operation knob 110 according to the second example.

As shown in FIGS. 6A to 6D, the operation knob 110 according to the second example is provided with four lateral surface sensor electrodes 111 separately from each other in an outer direction over the entire periphery of the lateral surface 110B. The lateral surface sensor electrodes 111 form an annular shape divided in four. In an outward direction of the lateral surface 110B, a width of the lateral surface sensor electrodes 111 is relatively large, and each lateral surface sensor electrode 111 is provided so that spaces between two adjacent lateral surface sensor electrodes 111 are relatively small.

Thus, the operation knob 110 according to the second example can reliably detect the contact by at least one of the four lateral surface sensor electrodes 111, even if the operator's finger 20 contacts the lateral surface 110B of the operation knob 110 at any angle.

Moreover, even if the operator's finger 20 contacts the lateral surface 110B at two positions separated from each other, the operation knob 110 according to the second example can individually detect the contact at the two positions by the two lateral surface sensor electrodes 111.

As shown in FIGS. 6A to 6D, the operation knob 110 according to the second example is provided with an insulating part 112 over the entire area of the upper surface 110A. Thus, even if the operator's finger 20 contacts any position of the upper surface 110A, the operation knob 110 according to the second example can surely prevent the contact from being detected as the contact with the lateral surface 110B.

As shown in FIGS. 6A to 6D, in the circuit board 122 corresponding to the operation knob 110 according to the second example, four substrate sensor electrodes 131A are provided at a position facing the bottom surface of the operation knob 110 in the same shape (i.e., annular shape divided into four) as the four lateral surface sensor electrodes 111 of the operation knob 110. Thus, in the circuit board 122 corresponding to the operation knob 110 according to the second example, even if the operator's finger 20 contacts the lateral surface 110B of the operation knob 110 at any angle, the contact can be surely detected by the electrostatic coupling. In the circuit board 122 shown in FIGS. 6A to 6D, a circular through-hole 122A for penetrating the rotating shaft 123 is formed at the annular center position formed by four substrate sensor electrodes 131A.

In addition, the circuit board 122 corresponding to the operation knob 110 according to the second example can detect the contact of the two positions individually by electrostatic coupling of the two substrate sensor electrodes 131A to the two lateral surface sensor electrodes 111 even if the operator's finger 20 contacts two positions separated from each other on the lateral surface 110B.

In addition, as shown in FIGS. 6A to 6D, the circuit board 122 corresponding to the operation knob 110 according to the second example is provided with a measurement circuit 131B and four interconnecting parts 131C respectively integrally formed with the four substrate sensor electrodes 131A, and the measurement circuit 131B is connected to each of the four substrate sensor electrodes 131A through the four interconnecting parts 131C. Thus, the circuit board 122 corresponding to the operation knob 110 according to the first example is configured so that the capacitance of each of the four substrate sensor electrodes 131A can be separately detected by the measurement circuit 131B.

When the operation knob 110 according to the second example is adopted, the control part 133 may control the kinesthetic haptic feedback part 140 so as to prevent the rotation of the operation knob 110 when contact with one lateral surface sensor electrode 111 is detected by the electrostatic sensor 131 or when contact with two lateral surface sensor electrodes 111 adjacent to each other is detected but contact with lateral surface sensor electrodes 111 not adjacent to each other is not detected.

Thus, the rotation input device 100 according to one embodiment can prevent the rotation of the operation knob 110 when the lateral surface 110B of the operation knob 110 is not gripped by a plurality of fingers 20 of the operator, assuming that the rotary operation is not performed in a correct posture. For example, when the operator's hand unintentionally touches the lateral surface of the operation knob 110, the operator's hand touches only one lateral surface sensor electrode 111 or only two lateral surface sensor electrodes 111 adjacent to each other. In such a case, by preventing the rotation of the operation knob 110, it is possible to prevent an operation that the operator does not intend.

(Example of Configuration of Operation Knob 110 (Third Example))

Figure 7A:
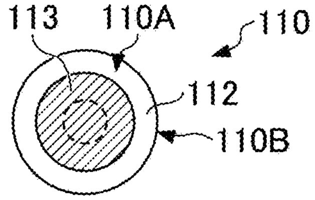
FIG. 7A is a drawing illustrating an example (third example) of a configuration of the operation knob in the rotation input device according to one embodiment.
Figure 7B:
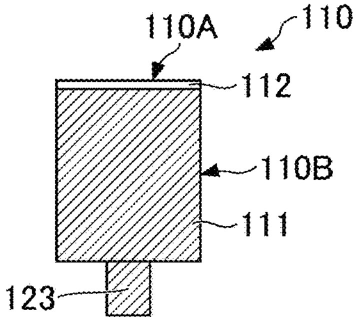
FIG. 7B is a drawing illustrating the example (third example) of the configuration of the operation knob in the rotation input device according to one embodiment.
Figure 7C:
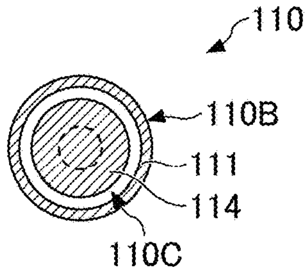
FIG. 7C is a drawing illustrating the example (third example) of the configuration of the operation knob in the rotation input device according to one embodiment.
Figure 7D:
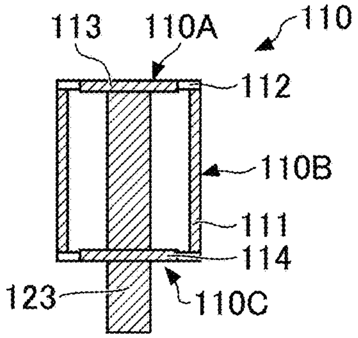
FIG. 7D is a drawing illustrating the example (third example) of the configuration of the operation knob in the rotation input device according to one embodiment.
Figure 7E:
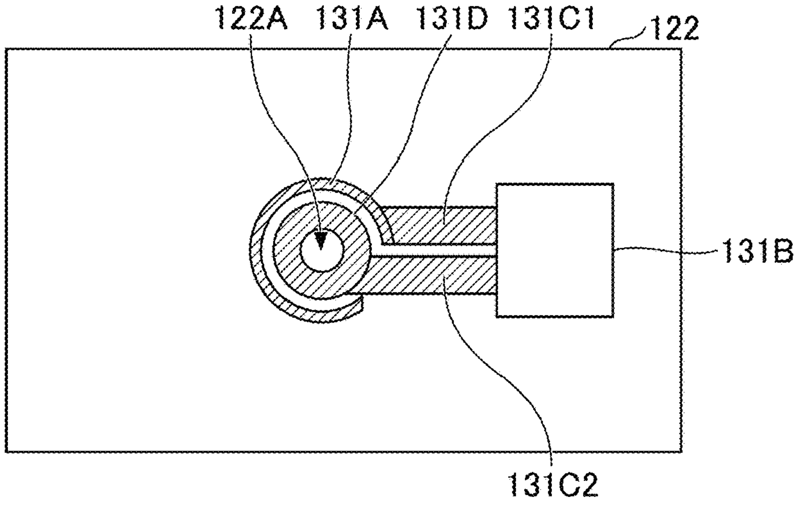
FIG. 7E is a drawing illustrating the example (third example) of the configuration of the operation knob in the rotation input device according to one embodiment.

FIGS. 7A to 7E are drawings illustrating an example (third example) of a configuration of the operation knob 110 in the rotation input device 100 according to one embodiment. FIG. 7A is a top view of the operation knob 110 according to the third example. FIG. 7B is a side view of the operation knob 110 according to the third example. FIG. 7C is a bottom view of the operation knob 110 according to the third example. FIG. 7D is a cross-sectional view of the operation knob 110 according to the third example. FIG. 7E is a top view of the circuit board 122 corresponding to the operation knob 110 according to the third example.

As shown in FIGS. 7A to 7E, the operation knob 110 according to the third example is provided with one lateral surface sensor electrode 111 annularly without interruption over the entire periphery of the lateral surface 110B. Thus, the operation knob 110 according to the third example can surely detect the contact by the one lateral surface sensor electrode 111 even if the operator's finger 20 contacts any angle of the lateral surface 110B of the operation knob 110.

As shown in FIGS. 7A to 7E, the operation knob 110 according to the third example has a circular upper surface sensor electrode 113 in the center of the upper surface 110A. Thus, in the operation knob 110 according to the third example, when the operator's finger 20 contacts the upper surface 110A of the operation knob 110, the contact can be reliably detected by the upper surface sensor electrode 113.

As shown in FIGS. 7A to 7E, the operation knob 110 according to the third example is provided with an annular insulating part 112 on a periphery of the upper surface sensor electrode 113 of the upper surface 110A. Thus, in the operation knob 110 according to the third example, the lateral surface sensor electrode 111 and the upper surface sensor electrode 113 are insulated.

Also, as shown in FIGS. 7A to 7E, in the operation knob 110 according to the third example, a circular bottom surface sensor electrode 114 is provided in the center of a bottom surface part 110C. In the operation knob 110 according to the third example, the upper surface sensor electrode 113 and the bottom surface sensor electrode 114 are connected to each other by a rotating shaft 123 penetrating the inside of the operation knob 110. Thus, in the operation knob 110 according to the third example, when an operator's finger 20 contacts the upper surface 110A of the operation knob 110, the capacitance of the bottom surface sensor electrode 114 is changed as in the case of the upper surface sensor electrode 113.

As shown in FIGS. 7A to 7E, in the circuit board 122 corresponding to the operation knob 110 according to the third example, the substrate sensor electrode 131A is provided in the same shape (i.e., annular) as a shape of the lateral surface sensor electrode 111 at a position facing the annular lateral surface sensor electrode 111 at the bottom surface part 110C of the operation knob 110. Thus, in the circuit board 122 corresponding to the operation knob 110 according to the third example, even if the operator's finger 20 contacts the lateral surface 110B of the operation knob 110 at any angle, the contact can be surely detected by electrostatic coupling of one substrate sensor electrode 131A to one lateral surface sensor electrode 111.

In addition, as shown in FIGS. 7A to 7E, in the circuit board 122 corresponding to the operation knob 110 according to the third example, the substrate sensor electrode 131D is provided in the same shape (i.e., circular) as the shape of the bottom surface sensor electrode 114 at a position facing the circular bottom surface sensor electrode 114 at the bottom surface part 110C of the operation knob 110. Thus, in the circuit board 122 corresponding to the operation knob 110 according to the third example, when the operator's finger 20 contacts the upper surface 110A of the operation knob 110, the contact can be surely detected by electrostatic coupling of the substrate sensor electrode 131D with the bottom surface sensor electrode 114.

In the circuit board 122 shown in FIGS. 7A to 7E, in the center position of the substrate sensor electrode 131D, a circular through-hole 122A for penetrating the rotating shaft 123 is formed.

In addition, as shown in FIGS. 7A to 7E, the circuit board 122 corresponding to the operation knob 110 according to the third example is provided with a measurement circuit 131B and an interconnecting part 131C1 integrally formed with the substrate sensor electrode 131A, and the measurement circuit 131B is connected to the substrate sensor electrode 131A through the interconnecting part 131C1. Thus, the circuit board 122 corresponding to the operation knob 110 according to the third example is configured so that the capacitance of the substrate sensor electrode 131A can be detected by the measurement circuit 131B.

As shown in FIGS. 7A to 7E, the circuit board 122 corresponding to the operation knob 110 according to the third example is provided with a measurement circuit 131B and an interconnecting part 131C2 integrally formed with the substrate sensor electrode 131D, and the measurement circuit 131B is connected to the substrate sensor electrode 131D via the interconnecting part 131C2. Thus, the circuit board 122 corresponding to the operation knob 110 according to the third example is configured so that the capacitance of the substrate sensor electrode 131D can be detected by the measurement circuit 131B.

(Example of Control Profile (First Example))

Figure 8:
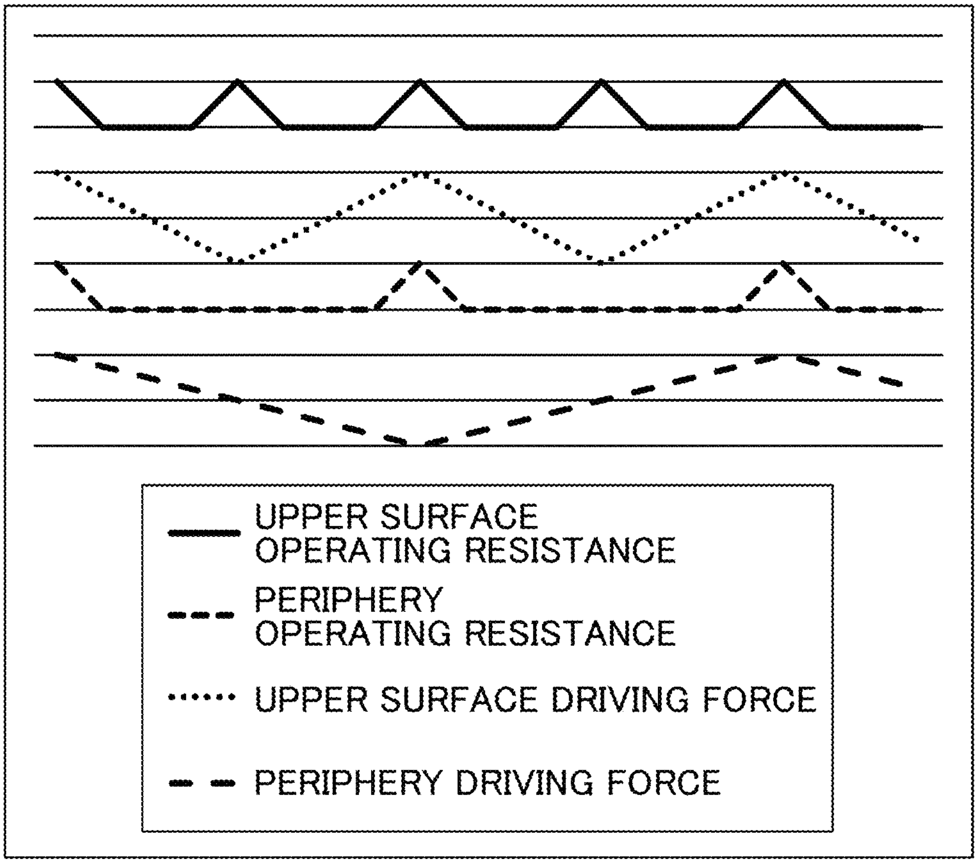
FIG. 8 is a drawing illustrating an example (first example) of a control profile used for control by the rotation input device according to one embodiment.

FIG. 8 is a drawing illustrating an example (first example) of a control profile used for control by the rotation input device 100 according to one embodiment.

The control profile shown in FIG. 8 illustrates the braking and driving forces applied to the operation knob 110 during a peripheral rotation (involving contact with the lateral surface 110B) and an upper surface rotation (involving contact with the upper surface 110A) with the operation knob 110.

According to the control profile shown in FIG. 8, each time the operation knob 110 performs a rotary operation by a predetermined rotation angle, the kinesthetic haptic feedback part 140 provides a click sensation to the operation knob 110 by providing resistance that rapidly increases or decreases, and provides a driving force that gradually increases according to the rotation angle, so that when the rotary operation is canceled, the operation knob 110 can automatically return to a position at a predetermined rotation angle.

However, according to the control profile shown in FIG. 8, the predetermined rotation angle for providing the click sensation is different between the case where the peripheral rotation is performed with the operation knob 110 and the case where the upper surface rotation is performed with the operation knob 110.

For example, according to the control profile shown in FIG. 8, when the peripheral rotation is performed with the operation knob 110, the kinesthetic haptic feedback part 140 provides the click sensation to the operation knob 110 at the predetermined rotation angle larger than the case where the upper surface rotation is performed with the operation knob 110.

As described above, the rotation input device 100 according to one embodiment can cause different kinesthetic haptic feedback to be generated for a case of the peripheral rotation with the operation knob 110 and a case of the upper surface rotation with the operation knob 110.

(Example of Control Profile (Second Example))

Figure 9:
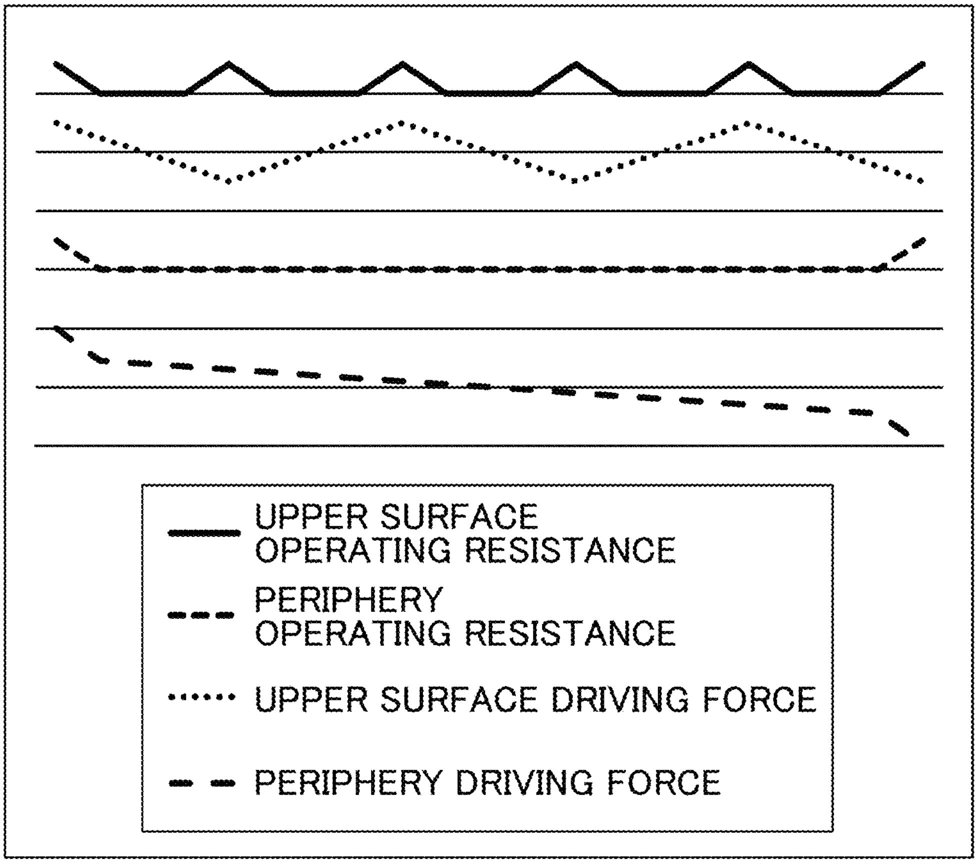
FIG. 9 is a drawing illustrating an example (second example) of a control profile used for control by the rotation input device according to one embodiment.

FIG. 9 is a drawing illustrating an example (second example) of a control profile used for control by the rotation input device 100 according to one embodiment.

The control profile shown in FIG. 9 illustrates the braking and driving forces applied to the operation knob 110 during a peripheral rotation (involving contact with the lateral surface 110B) and an upper surface rotation (involving contact with the upper surface 110A) with the operation knob 110.

According to the control profile shown in FIG. 9, when the operation knob 110 performs an upper surface rotation, each time the operation knob 110 performs a rotary operation of a predetermined rotation angle, the kinesthetic haptic feedback part 140 provides a click sensation to the operation knob 110 by providing resistance that rapidly increases or decreases, and provides a driving force that gradually increases according to the rotation angle, so that when the rotary operation is canceled, the operation knob 110 can automatically return to a position at a predetermined rotation angle.

Moreover, according to the control profile shown in FIG. 9, when the operation knob 110 performs an upper surface rotation, the kinesthetic haptic feedback part 140 does not limit the rotation angle of the upper surface rotation.

Additionally, according to the control profile shown in FIG. 9, when the operation knob 110 performs an outer peripheral rotation, the kinesthetic haptic feedback part 140 provides a driving force that gradually increases according to the rotation angle and becomes maximum when the rotation angle is greater than +150° or less than-150° to the operation knob 110.

Thus, the rotation input device 100 according to one embodiment can automatically return the operation knob 110 to an initial position (i.e.) 0° when the peripheral rotation by the operation knob 110 is canceled.

According to the control profile shown in FIG. 9, when the operation knob 110 performs a peripheral rotation of a predetermined allowable rotation angle (+150° or −150°) or more, the kinesthetic haptic feedback part 140 provides maximum resistance to the operation knob 110 to prevent the rotation of the operation knob 110.

As described above, the rotation input device 100 according to one embodiment can cause different kinesthetic haptic feedback to be generated for a case of the peripheral rotation with the operation knob 110 and a case of the upper surface rotation with the operation knob 110.

(Example of Control Profile (Third Example))

Figure 10:
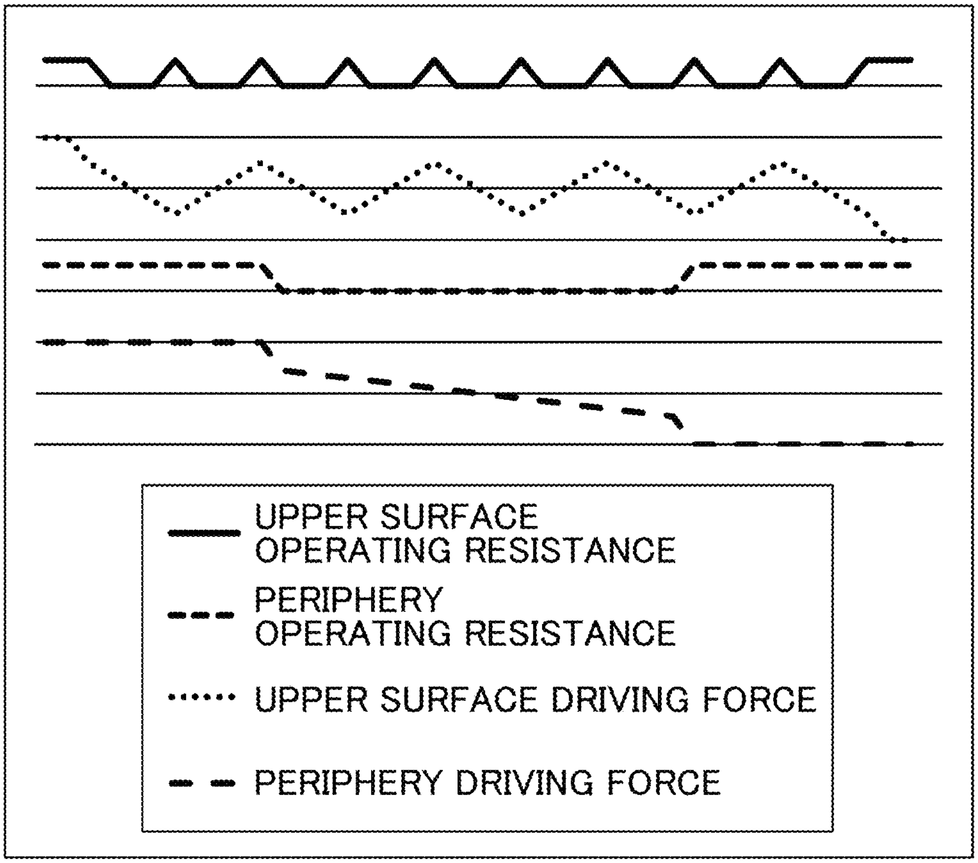
FIG. 10 is a drawing illustrating an example (third example) of a control profile used for control by the rotation input device according to one embodiment.

FIG. 10 is a drawing illustrating an example (third example) of a control profile used for control by the rotation input device 100 according to one embodiment.

The control profile shown in FIG. 10 illustrates the braking and driving forces applied to the operation knob 110 during a peripheral rotation (involving contact with the lateral surface 110B) and an upper surface rotation (involving contact with the upper surface 110A) with the operation knob 110.

According to the control profile shown in FIG. 10, when the operation knob 110 performs an upper surface rotation, each time the operation knob 110 performs a rotary operation of a predetermined rotation angle, the kinesthetic haptic feedback part 140 provides a click sensation to the operation knob 110 by providing resistance that rapidly increases or decreases, and provides a driving force that gradually increases according to the rotation angle, so that when the rotary operation is canceled, the operation knob 110 can automatically return to a position at a predetermined rotation angle.

In addition, according to the control profile shown in FIG. 10, when an upper surface rotation of a predetermined first allowable rotation angle or more by the operation knob 110 is performed, the kinesthetic haptic feedback part 140 provides maximum resistance to the operation knob 110 to prevent the rotation of the operation knob 110.

Additionally, according to the control profile shown in FIG. 10, when a peripheral rotation by the operation knob 110 is performed, the kinesthetic haptic feedback part 140 provides a driving force gradually increasing according to the rotation angle to the operation knob 110, so that the operation knob 110 can automatically return to the initial position (i.e., 0°) when the rotary operation is canceled.

In addition, according to the control profile shown in FIG. 10, when a peripheral rotation of a predetermined second allowable rotation angle (second allowable rotation angle <first allowable rotation angle) or more by the operation knob 110 is performed, the kinesthetic haptic feedback part 140 provides maximum resistance to the operation knob 110 to prevent the rotation of the operation knob 110.

As described above, the rotation input device 100 according to one embodiment can cause different kinesthetic haptic feedback to be generated for a case of the peripheral rotation with the operation knob 110 and a case of the upper surface rotation with the operation knob 110.

(Example of Control Profile (Fourth Example))

Figure 11:
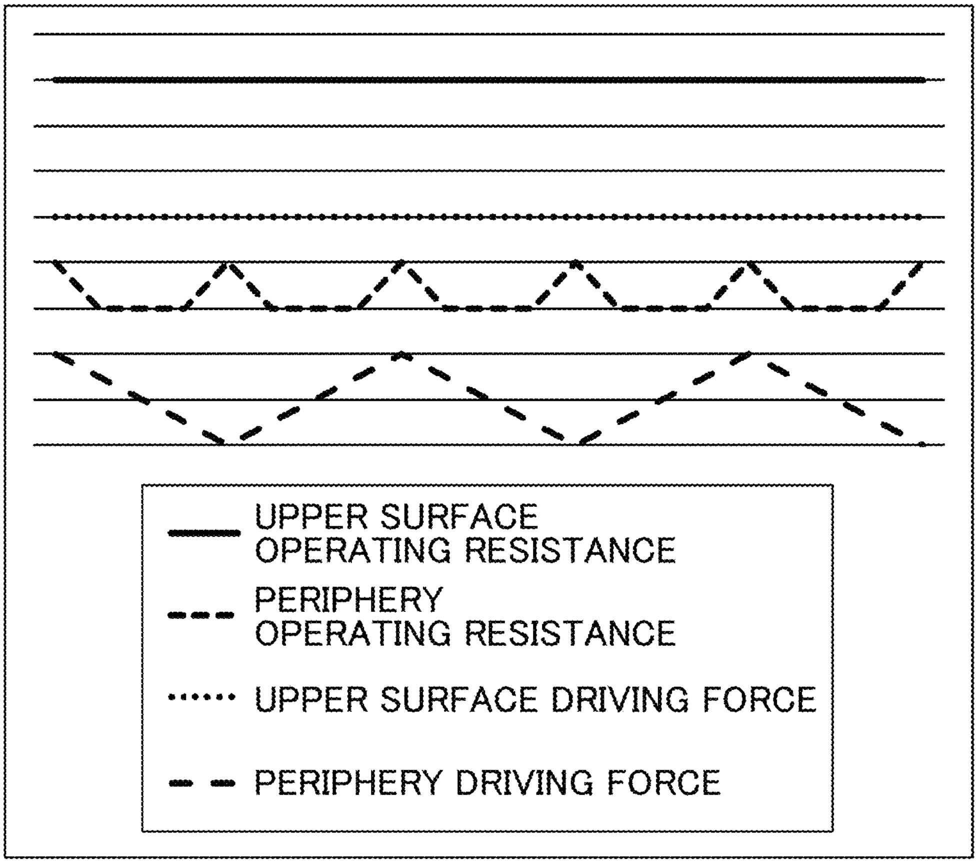
FIG. 11 is a drawing illustrating an example (fourth example) of a control profile used for control by the rotation input device according to one embodiment.

FIG. 11 is a drawing illustrating an example (fourth example) of a control profile used for control by the rotation input device 100 according to one embodiment.

The control profile shown in FIG. 11 illustrates the braking and driving forces applied to the operation knob 110 during a peripheral rotation (involving contact with the lateral surface 110B) and an upper surface rotation (involving contact with the upper surface 110A) with the operation knob 110.

According to the control profile shown in FIG. 11, when the operation knob 110 performs an upper surface rotation, the kinesthetic haptic feedback part 140 provides maximum resistance to the operation knob 110 to prevent the rotation of the operation knob 110. In this case, the kinesthetic haptic feedback part 140 does not apply a driving force to the operation knob 110. In the control profile shown in FIG. 11, by prohibiting the operation when the upper surface rotation is performed, it is possible to prevent the operator from unintentionally touching the operation knob 110 and performing an erroneous operation. In particular, by using the operation knob 110 shown in FIGS. 6A to 6D, it is possible to control the operation so as to be operable only when the operator touches two or more of the lateral surfaces 110B. Conversely, when the operator touches only one of the lateral surfaces 110B, it is regarded as an erroneous operation in which the operator unintentionally touches the operation knob 110.

Additionally, according to the control profile shown in FIG. 11, when the peripheral rotation is performed by the operation knob 110, the kinesthetic haptic feedback part 140 provides a click sensation to the operation knob 110 by providing resistance which rapidly increases or decreases every time the operation knob 110 performs a rotary operation of a predetermined rotation angle, and by providing a driving force which gradually increases according to the rotation angle, the operation knob 110 can automatically return to a position at a predetermined rotation angle when the rotary operation is released.

As described above, the rotation input device 100 according to one embodiment can cause different kinesthetic haptic feedback to be generated for a case of the peripheral rotation with the operation knob 110 and a case of the upper surface rotation with the operation knob 110.

Further, the present invention is not limited to these embodiments, but various variations and modifications may be made without departing from the scope of the present invention.

What is claimed is:

1. A rotary input device comprising:

an operation knob including an upper surface and a lateral surface;

an angle detector configured to detect a rotation angle of the operation knob;

a kinesthetic haptic feedback part configured to provide at least one of a driving force or a braking force to the operation knob as kinesthetic haptic feedback;

control circuitry configured to control the kinesthetic haptic feedback part;

a lateral surface sensor electrode provided on the lateral surface of the operation knob;

an electrostatic sensor configured to detect a contact of an operating body with the lateral surface sensor electrode; and a main body including the kinesthetic haptic feedback part, the angle detector, the electrostatic sensor, and a rotating shaft rotating integrally with the operation knob, wherein the control circuitry is configured to control the kinesthetic haptic feedback part so as to provide kinesthetic haptic feedback to the operation knob according to a detection result of the electrostatic sensor and a detection result of the angle detector, wherein the kinesthetic haptic feedback part is configured to provide the kinesthetic haptic feedback to the operation knob via the rotating shaft, wherein the angle detector is configured to detect a rotation angle of the rotating shaft as the rotation angle of the operation knob, and wherein the electrostatic sensor includes a substrate sensor electrode provided in the main body at a position at which the substrate sensor electrode can be electrostatically coupled with the lateral surface sensor electrode, and the electrostatic sensor is configured to detect the contact of the operating body with the lateral surface sensor electrode by detecting capacitance of the substrate sensor electrode.

2. The rotary input device according to claim 1, comprising four or more portions of the lateral surface sensor electrode provided separately from each other on the lateral surface of the operation knob, wherein the electrostatic sensor includes four or more portions of the substrate sensor electrode, each corresponding to a respective one of the four or more portions of the lateral surface sensor electrode.

3. The rotary input device according to claim 2, wherein the control circuitry is configured to control the kinesthetic haptic feedback part so as to prevent a rotation of the operation knob when a contact of the operating body with at least two portions of the lateral surface sensor electrode that are not adjacent is not detected.

4. The rotary input device according to claim 1, comprising an upper surface sensor electrode provided on the upper surface of the operation knob, wherein the electrostatic sensor is further configured to detect a contact of the operating body with the upper surface sensor electrode.

5. The rotary input device according to claim 1, wherein the control circuitry is configured to:

control the kinesthetic haptic feedback part so as to provide the kinesthetic haptic feedback according to the rotation angle to the operation knob; and cause different kinesthetic haptic feedback to be generated for a case when the electrostatic sensor detects the contact of the operating body with the lateral surface sensor electrode and a case when the electrostatic sensor does not detect the contact of the operating body with the lateral surface sensor electrode.

6. The rotary input device according to claim 5, wherein the control circuitry is configured to:

control the kinesthetic haptic feedback part so as to provide a click sensation for each rotation of the operation knob by a predetermined rotation angle; and change the predetermined rotation angle according to the detection result of the electrostatic sensor.

7. The rotary input device according to claim 5, wherein the control circuitry is configured to:

control the kinesthetic haptic feedback part so as to prevent a rotation of the operation knob when a performed rotation is equal to or greater than a predetermined allowable rotation angle; and change the predetermined allowable rotation angle according to the detection result of the electrostatic sensor.

8. The rotary input device according to claim 5, wherein the control circuitry is configured to:

control the kinesthetic haptic feedback part such that the driving force provided to the operation knob gradually increases until a predetermined rotation angle; and change the predetermined rotation angle according to the detection result of the electrostatic sensor.

9. The rotary input device according to claim 1, wherein the kinesthetic haptic feedback part includes a brake mechanism configured to generate the braking force with a magneto-viscous fluid.

10. The rotary input device according to claim 1, wherein the kinesthetic haptic feedback part includes a motor configured to generate the driving force by rotating.

11. A rotary input device comprising:

an operation knob including an upper surface and a lateral surface;

an angle detector configured to detect a rotation angle of the operation knob;

a kinesthetic haptic feedback part configured to provide at least one of a driving force or a braking force to the operation knob as kinesthetic haptic feedback;

control circuitry configured to control the kinesthetic haptic feedback part;

a lateral surface sensor electrode provided on the lateral surface of the operation knob; and an electrostatic sensor configured to detect a contact of an operating body with the lateral surface sensor electrode, wherein the control circuitry is configured to control the kinesthetic haptic feedback part so as to provide kinesthetic haptic feedback to the operation knob according to a detection result of the electrostatic sensor and a detection result of the angle detector, wherein the control circuitry is configured to:

control the kinesthetic haptic feedback part so as to provide the kinesthetic haptic feedback according to the rotation angle to the operation knob;

cause different kinesthetic haptic feedback to be generated for a case when the electrostatic sensor detects the contact of the operating body with the lateral surface sensor electrode and a case when the electrostatic sensor does not detect the contact of the operating body with the lateral surface sensor electrode; and control the kinesthetic haptic feedback part so as to prevent a rotation of the operation knob when the electrostatic sensor does not detect the contact of the operating body with the lateral surface sensor.

12. The rotary input device according to claim 11, comprising an upper surface sensor electrode provided on the upper surface of the operation knob, wherein the electrostatic sensor is further configured to detect a contact of the operating body with the upper surface sensor electrode.

13. The rotary input device according to claim 11, wherein the kinesthetic haptic feedback part includes a brake mechanism configured to generate the braking force with a magneto-viscous fluid.

14. The rotary input device according to claim 11, wherein the kinesthetic haptic feedback part includes a motor configured to generate the driving force by rotating.

* * * * *